united States Patent Office 3,364,139
Patented Jan. 16, 1968

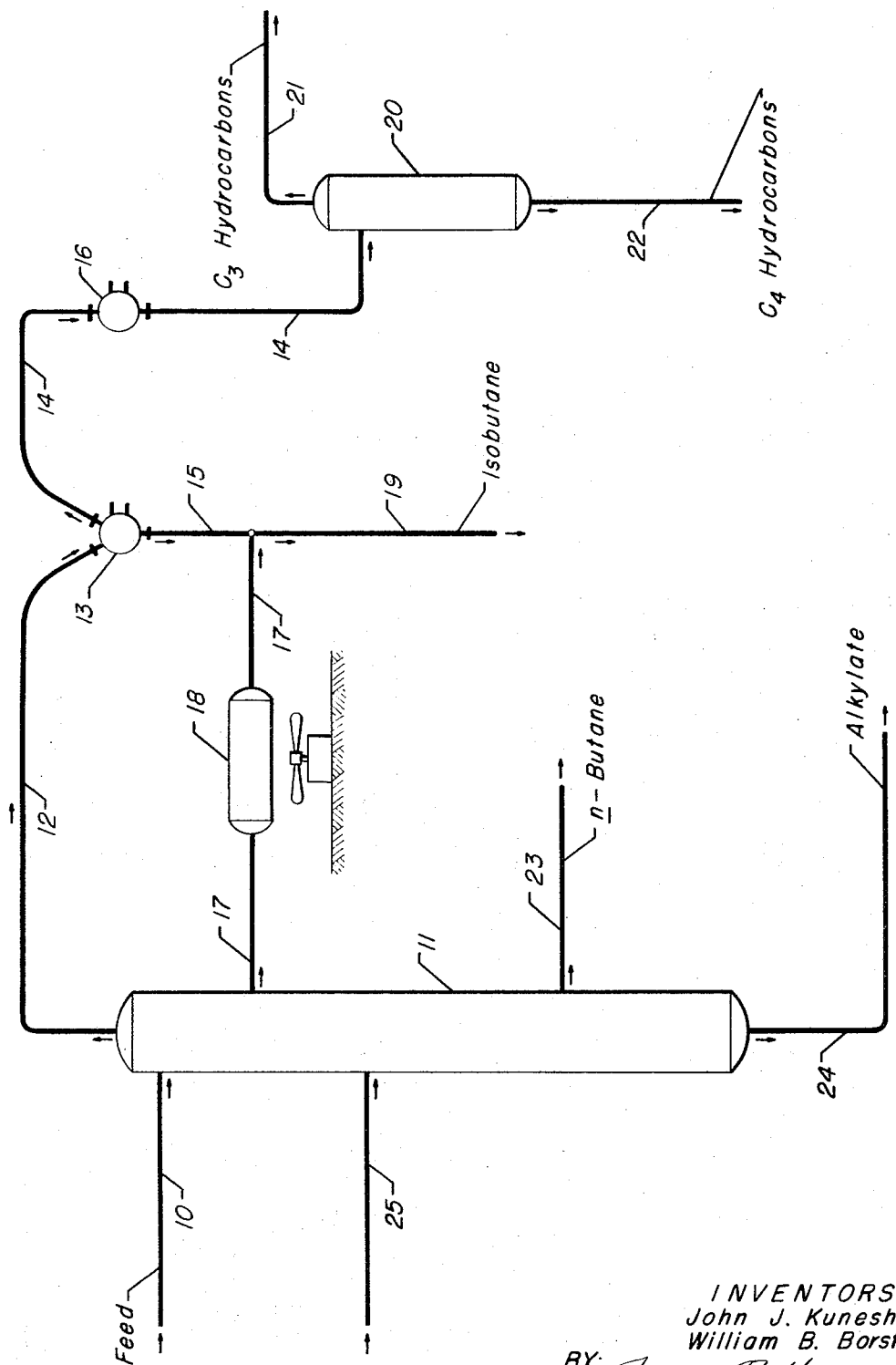

3,364,139
METHOD FOR SEPARATING ISOBUTANE
FROM AN ALKYLATE EFFLUENT
John G. Kunesh, Arlington Heights, and William B. Borst, Jr., Mount Prospect, Ill., assignors to Universal Oil Products Company, Des Plaines, Ill., a corporation of Delaware
Filed Dec. 1, 1966, Ser. No. 598,488
7 Claims. (Cl. 208—347)

This invention relates to a fractionation method. It particularly relates to a method for separating light hydrocarbon components by distillation. It specifically relates to a method for separating normally gaseous hydrocarbons from the effluent of an isoparaffin-olefin hydrocarbon alkylation reaction zone.

It is well-known in the prior art that catalytic alkylation using a catalyst such as hydrofluoric acid or sulphuric acid has become an important chemical tool for preparing alkylated hydrocarbons and derivatives thereof. The commercial and industrial demand for these products is exemplified by the demand for isoparaffin hydrocarbons and alkyl-substituted benzenes of gasoline boiling range and the demand for alkyl-substituted aromatic hydrocarbons suitable for conversion to surfactants, e.g. detergents, wetting agents, etc. The prior art processes of alkylation generally are effected by contacting an isoparaffin hydrocarbon feed stock with an olefin hydrocarbon in the presence of a catalyst such as hydrofluoric acid in a conventional reaction vessel for conducting chemical reactions.

The catalytic alkylation process to which the present invention is applicable consists of a process in which a mixture of hydrocarbons containing isoparaffins such as isobutane, isopentane, and the like, and olefins such as propylene, butylenes, isobutenes, amylenes, and the like, are mixed intimately in the presence of a strong acid catalyst such as hydrofluoric acid or sulphuric acid at generally room temperatures or lower for sufficient time to complete the reaction. The effluent from the reaction zone contains isoparaffin hydrocarbons of higher molecular weight than the isoparaffins in the original mixture. Isobutane has been used almost exclusively because of its reactivity and availability to produce high quality alkylate products. Accordingly, for convenience, the term "alkylate" as used in this specification is intended to embody the higher molecular weight reaction product from the alkylation reaction. In similar manner among the olefins, butenes have been used almost exclusively. Propylene and the pentenes, and even higher boiling olefinic hydrocarbons, can be used according to their availability.

However, as is typical in most commercial and chemical plants, the reaction between the isobutane and the olefin, such as butylene, requires the presence of a large excess quantity of isobutane (6:1 to 16:1 iso $C_4/C_4$ olefin molar ratio) in the reaction zone to significantly enhance the quality of the alkylate produced. Accordingly, there is a large excess of isoparaffin hydrocarbon remaining in the effluent from the alkylation reaction zone. Thus, it is desirable to recover and reuse the isoparaffin reactant in as high yield as possible and in as simple and economical manner as possible.

In like manner, propane which passes through the alkylation reaction unchanged and the small amount of propane that is produced from the reaction must also be removed from the desired alkylate product. The separation of the propane from isobutane is conveniently done in a depropanizing column since the deisobutanizer tower can only separate the isobutane from the normal butane in an economical manner. Thus, the depropanizer column is normally of considerable size so that propane can be recovered in substantially pure form and $C_4$ hydrocarbons may be rejected from the bottom of the tower suitable for reuse in the reaction or for other uses known to those skilled in the art. Therefore, it is desirable to separate the propane or $C_3$ hydrocarbons from the $C_4$ hydrocarbons in as economical manner as possible.

In practice, there have been numerous process gains advanced by the prior art for accomplishing the alkylation reaction recovery of the isoparaffin hydrocarbon and recovery of the $C_3$ hydrocarbons. Generally, the prior art has taken the hydrocarbon portion of the reaction zone effluent into what is commonly called a deisobutanizer tower wherein an isobutane stream is recovered as an overhead fraction and the desired alkylate product is removed from the bottom of the tower. The difficulty with this practice is that the feed streams from normal refining operations to an alkylation plant contain not only the desired reactants, isobutane and butylene, but also contain $C_2$ to $C_5$ hydrocarbons in various amounts. Therefore, the overhead stream from the deisobutanizer tower in a conventional alkylation plant not only contains isobutane, but also contains at least the $C_3$ hydrocarbons which were present in the feed. In order to make an economical separation of the $C_3$ and $C_4$ hydrocarbons the deisobutanizer tower of necessity must be of considerable height and also must contain extensive condensing and receiving equipment for the overhead streams. Typically, the prior art deisobutanizer tower is operated such that the desired isobutane fraction is condensed and a vapor fraction containing the $C_3$ hydrocarbons is removed from the overhead receiver for further processing in a subsequent depropanizer tower.

It is an object of the present invention to provide a fractionation scheme.

It is another object of this invention to provide an improved distillation method for the recovery of isoparaffin reactant for reuse in an alkylation process with simultaneous recovery of the $C_3$ hydrocarbons.

It is a specific object of this invention to provide a fractionation scheme for the preparation of the feed stock to a depropanizer column operating in conjunction with an isobutane stripping tower in a more facile and economical manner.

It is still another object of this invention to provide a method for enriching the feed to the depropanizer column operating in conjunction with a deisobutanizer column.

As was previously noted, the feed stock to the conventional alkylation reaction preferably comprises isobutane and butylene. However, as will be more fully developed herein, the present invention is particularly directed to a feed mixture containing $C_3$ and $C_4$ olefins as well as the $C_2$ to $C_5$ paraffins, but which will predominate in the $C_4$ hydrocarbons. In similar manner, the invention contemplates the use of any suitable catalyst material, in addition to hydrofluoric acid, such as sulphuric acid, mixtures of sulphuric and phosphoric acid, and certain complexes of aluminum chloride and sulphuric acid, etc. Therefore, according to the present invention, there is provided a method for separating normally gaseous hydrocarbons from the hydrocarbon effluent of an isobutane-olefin alkylation reaction zone, which comprises the steps of:

(a) Introducing the hydrocarbon effluent from said reaction zone into the upper section of first fractionation means maintained under fractionation conditions;

(b) Removing an overhead first vapor fraction comprising $C_3$ and $C_4$ hydrocarbons;

(c) Withdrawing a side-cut fraction comprising isobutane at a locus below the locus for introducing said effluent;

(d) Partially condensing said overhead fraction under conditions sufficient to produce a second vapor fraction comprising C$_3$ hydrocarbons and a liquid stream comprising isobutane;

(e) Condensing said side-cut fraction;

(f) Condensing said second vapor fraction;

(g) Passing the condensed second vapor fraction into second fractionation means under conditions sufficient to produce a substantially pure C$_3$ product stream;

(h) Returning isobutane to said reaction zone; and (i) Removing from said first fractionation means a bottoms fraction comprising alkylate.

A specific embodiment of this invention includes the method herein above wherein said olefin hydrocarbon comprises butylenes.

Another specific embodiment of this invention includes the method herein above wherein said side-cut fraction contains a major proportion of the isobutane present in said effluent.

An illustrative embodiment of this invention embodies the method for separating the hydrocarbon effluent from an isobutane-butylene alkylation reaction zone comprising:

(a) Introducing said effluent at a temperature from 120° F. to 150° F. to the top of a first distillation column;

(b) Removing an overhead vapor fraction comprising C$_3$ hydrocarbons and isobutane at a temperature from 130° F. to 175° F.;

(c) Withdrawing an upper side-cut vapor fraction comprising isobutane at a temperature from 150° F. to 175° F.;

(d) Partially condensing said overhead fraction under conditions sufficient to produce a second vapor fraction comprising C$_3$ hydrocarbons and a liquid stream comprising isobutane;

(e) Condensing said upper side-cut fraction by indirect heat exchange with air;

(f) Condensing said second vapor fraction to produce an impure liquid stream comprising C$_3$ hydrocarbons contaminated with C$_4$ hydrocarbons;

(g) Passing said impure stream into a second distillation column under conditions sufficient to produce a substantially pure C$_3$ hydrocarbon stream and a residual stream comprising C$_4$ hydrocarbons;

(h) Withdrawing from said first distillation column a lower side-cut fraction comprising n-butane;

(i) Removing a bottoms fraction from said first distillation column comprising alkylate at a temperature from 330° F. to 450° F.; and (j) Recycling condensed isobutane to said reaction zone.

Another illustrative embodiment of the present invention includes the method herein above wherein said second vapor fraction comprises from 5% to 50% by weight of said overhead fraction.

The objects and advantages of this invention will be more clearly understood from the description presented hereinbelow and with reference to the appended drawing which is a diagrammatic representation of apparatus for practicing the invention.

The description of the present invention will be limited to the processing scheme for handling the effluent from a conventional C$_4$ alkylation reaction zone although the scope of the invention is not necessarily to be limited thereto. The effluent is prepared by means well-known to those skilled in the art and generally comprises the steps of commingling an olefin-containing feed stock with an isoparaffin-containing feed stock and passing the mixture into a conventional alkylation reactor vessel. An isobutane-enriched paraffinic hydrocarbon stream is also added to the reaction zone in order that the isoparaffin-to-olefin ratio in the presence of the catalyst is at the proper level. Means of removing the heat of reaction from the reactor must be provided and the contact time in the reactors maintained for a period sufficient to intimately mix and contact the feed mixture with the catalyst so that the alkylation reaction can occur. The total effluent from the reaction zone is removed and passed into separation means whereby the acid is separated from the hydrocarbon phase, generally by settling. The acid is returned to the process in admixture with fresh acid catalyst, as needed, and the hydrocarbon phase is further processed in accordance with the present invention. It is to be noted that as used herein the term "hydrocarbon effluent" is intended to embody only the hydrocarbon phase which has already been separated from the total effluent from the catalytic alkylation reaction zone.

Conventional conversion conditions of temperature, pressure, isoparaffin-olefin ratio, and hydrogen fluoride-hydrocarbon ratio can be employed advantageously in the reaction zone contemplated herein. For example, the alkylation of isobutane with butylenes can be carried out at temperatures between 0° F and 150° F., preferably 80° F. and 110° F., at pressures sufficiently high to keep the hydrocarbon and catalyst in liquid phase and at isobutane-butylene molar ratios between 2:1 and 20:1, preferably between 10:1 and 15:1. Ratios of isobutane to butylene of at least 2:1 are essential since lower ratios tend to cause polymerization of the butylenes with the resulting decrease in yield of the desired alkylate product. The volume ratio of catalyst to hydrocarbon charge can be varied considerably. For example, a ratio of 0.5:1 to 10:1 can be used. Preferably, at least 1:1 is used. The acid catalyst charged through the reactor system can be substantially anhydrous and can have a titratable acidity as low as 65%, by weight, but preferably is maintained between 85% and 95% acidity.

When operating a hydrogen fluoride alkylation unit in the manner described herein and utilizing the method of the present invention, an alkylate product having an end point below 400° F. and a leaded octane (at 3 cc. TEL/gal. of alkylate) of at least 105 is attained with a hydrogen fluoride catalyst consumption of less than 0.2 lbs. of catalyst per barrel of alkylate produced. Additionally, as will become obvious from the description, significant economy of operation is achieved over the process schemes taught by the prior art.

The C$_3$ hydrocarbon is removed and recovered from the method according to this invention in substantially pure form and may be used conveniently as a household fuel or LPG gas. The description of the present invention will disclose a method for separating normally gaseous hydrocarbons from the effluent of, for example, a C$_4$ alkylation reaction zone. Inherently involved in the processing scheme are conventional means for removing residual acid catalyst from the various streams as they are processed through the fractionation train. These conventional acid removal schemes have not been disclosed or discussed but are well-known to those skilled in the art. Thus, the present invention, as will become more evident from the description presented herein below, with reference to the appended drawing, provides a novel two-stage method for preparing feed to a depropanizer column where substantially pure C$_3$ hydrocarbons are recovered from the system and considerable economy of operation is achieved through the use of air as a cooling medium for the large amount of isobutane which must be, for economy sake, recycled to the catalytic alkylation zone.

Referring now to the drawing, the effluent from the alkylation reaction zone substantially free from a major proportion of the, for example, hydrogen fluoride acid catalyst, is passed into deisobutanizer stripper column 11 via line 10. Typically, this hydrocarbon effluent fraction in line 10 passing into stripper 11 contains C$_3$+ hydrocarbons such as propane, isobutane, n-butane, isopentane, pentane, and C$_6$+ hydrocarbons, commonly called "alkylate," which is removed from stripper column 11 via line 24 for blending into motor fuel or for other uses known to those skilled in the art. The alkylate product removed via line 24 may contain sufficient C$_4$ hydrocarbons (n-butane) for proper vapor pressure control, e.g. 7 pounds Reid, in addition to pentanes and heavier material, although for convenience the material in line 24 will be referred to herein as $C_6+$ hydrocarbon material.

Typically, the deisobutanizer column, or isostripper column, is a fractionation column seven feet in diameter containing 50 trays spaced 24 inches apart. It operates at a pressure of less than 200 p.s.i.g., e.g. about 150 p.s.i.g., with a top temperature of from 130° F. to 175° F., typically about 155° F., and a bottoms temperature from 330° F. to 450° F., typically about 385° F. Preferably column 11 is fed near the middle of the vessel with a saturate butane stream via line 25. This saturate stream supplies isobutane to supplement that contained in the olefin-containing feed. Excess n-butane is withdrawn as a lower side-cut fraction via line 23 and leaves the system as a separate product.

Within isostripper column 11, a substantial separation is made between the lower boiling isobutane, higher boiling n-butane, and the reaction products. A combination of isobutane flashing and alkylate stripping is accomplished in this column. As can be seen from the description presented herein above, the column has no external reflux and operates as a true stripper column. It is no longer necessary to employ extremely costly reflux ratios to provide isobutane of high purity as recycled to the reactor. In addition, the n-butane present in the olefin feed to the alkylation unit, plus the n-butane which is usually found in the outside isobutane stream, plus the small amount of n-butane produced in the alkylation process itself, all must leave the system. Otherwise, if the n-butane were allowed to accumulate in the alkylate its vapor pressure would be extremely high and no control of the vapor pressure of the product alkylate could be exercised without the use of a subsequent stabilizing step.

In the design of modern alkylation units vapor pressure control of the alkylate is achieved by withdrawing a vapor side-cut at the proper point, e.g. line 23, on the isostripper column 11. The position of the withdrawal point is usually chosen so that the n-butane side-cut will contain less than about 5% isobutane and less than about 4% pentanes and still allow for some control of the vapor pressure of the product alkylate.

Referring again to the diagram, an overhead stream comprising $C_3$ hydrocarbons and a small amount of isobutane is removed via line 12 at a temperature from 130° F. to 175° F. Since a considerable amount of the material passing into isostripper 11 consists of isobutane, the present invention has now discovered that considerable economy of operation may be achieved if the bulk of the isobutane present in the feed were removed from the column as a vapor stream at a locus below the locus for the feed stream, such as via line 17. It was discovered that the removal of an upper vapor side-cut fraction via line 17 enabled the use of air condenser 18 rather than water, to provide the major amount of cooling duty required for the handling of the products separated in column 11. Therefore, in the practice of this invention, a vapor side-cut fraction comprising isobutane is removed from column 11 via line 17 and passed into air condenser 18. This upper side-cut vapor fraction is typically withdrawn at a temperature from about 150° F. to 175° F.

The overhead fraction comprising $C_3$ hydrocarbons and isobutane is passed into partial condenser 13 wherein a major portion of the isobutane is condensed with a major portion of the $C_3$ hydrocarbons remaining in the vapor phase and passing from partial condenser 13 via line 14 into condensing zone 16 wherein total condensation takes place such that a liquid stream is removed from condenser 16 and passed into depropanizer column 20. The $C_4$ hydrocarbons condensed in partial condenser 13 are removed from the condenser via line 15 and passed out of the system in admixture with the condensed isobutane leaving condenser 18 via line 17. The combined isobutane stream leaves the system via line 19.

Typically, the conditions maintained in separator 13 are sufficient to produce a second vapor fraction in line 14 comprising mostly $C_3$ hydrocarbons with a small amount of $C_4$ hydrocarbons and a liquid stream comprising isobutane in line 15. The operating conditions in the separator (partial condenser) 13 include, typically, a temperature of approximately 140° F. and a pressure of approximately 140 p.s.i.g. Under these typical conditions approximately 23%, by volume, of the feed mixture in line 12 remains a vapor and is removed via line 14. However, separator 13 may also be operated under a range of temperatures from 90° F. to 160° F. and pressures from 100 p.s.i.g. to 200 p.s.i.g. In the practice of this invention the amount of vapor removed from separator 13 and line 14 may be from 5% to 50%, by weight, of the material in line 12.

The material in line 14 having been condensed by condenser 16 is passed into depropanizer column 20, as previously mentioned, wherein substantially pure $C_3$ hydrocarbons are removed from the system via line 21. The remaining portion of the material in line 14 is removed from column 20 via line 22 and comprises essentially $C_4$ hydrocarbons which may be removed from the process or may be commingled with the $C_4$ hydrocarbons in line 19 for recycle to the catalytic alkylation zone.

Depropanizer column 20 typically is a vessel of about four feet in diameter containing 36 trays or perforated plates spaced 24 inches apart. The depropanizer column 20 operates at a pressure of about 275 p.s.i.g. with a top temperature of about 125° F. and a bottoms temperature of about 215° F. Since substantial quantities of $C_4$ hydrocarbons have been removed, the utility cost, e.g. heat requirements for reboiling, are significantly less than would be for conventional depropanizer towers operating in similar service. In some cases practice of the invention may reduce the size considerably of the depropanizer tower.

Additionally, it is to be noted that since the major proportion of the isobutane present in the feed to the column has been removed by line 17 and passed through air condenser 18, the overhead condensing system, typically condenser-separator 13, and condenser 16, may be of considerably smaller size since the bulk of the cooling duty around the deisobutanizer column is achieved through the use of air in air exchanger 18. This represents a considerable economy of operation over the prior art processing schemes.

The following example presents a preferred embodiment for the practice of this invention.

*Example*

A commercial scale operation is presented utilizing the process flow shown diagrammatically in the attached drawing hereto. The material in line 10 representing feed to deisobutanizer column 11 has a composition of 413 moles per hour of propane, 2838 moles per hour of isobutane, 674 moles per hour of n-butane, 20 moles per hour of isopentane, 2 moles per hour of n-pentane, and 400 moles per hour of alkylate. The feed stream is charged to tower 11 at a temperature of about 135° F. and a pressure of about 155 p.s.i.g. The overhead vapor stream leaving column 11 via line 12 is at a temperature of about 160° F. and is composed of 108 moles an hour of propane, 443 moles per hour of isobutane, and 57 moles per hour of n-butane.

The material leaving column 11 via line 17, which is the upper side-cut vapor fraction, is at a temperature of about 160° F. and is composed of 324 moles per hour of propane, 2574 moles per hour of isobutane, and 546 moles per hour of n-butane. The side-cut vapor fraction in line 17 is condensed in air condenser 18 and leaves condenser 18 at a temperature of about 110° F. and a pressure of about 150 p.s.i.g.

A vapor stream comprising n-butane is removed from column 11 via line 23 at a temperature of about 190° F. and a pressure of about 160 p.s.i.g. Alkylate product is removed from the system via line 24 at a temperature of about 385° F. and a pressure of about 160 p.s.i.g. The alkylate product is composed of 2 moles per hour of isobutane, 45 moles per hour of n-butane, 17 moles per hour of isopentane, 2 moles per hour of n-pentane, and 399 moles per hour of alkylate product.

The material in line 12 representing the total overhead from column 11 is condensed in partial condenser 13 from a temperature of about 160° F. to a temperature of about 125° F. The condensed liquid removed from condenser 13 and line 15 is composed of 78 moles per hour of propane, 353 moles per hour of isobutane and 47 moles per hour of n-butane. The vapor material in line 14 is composed of 29 moles per hour of propane, 90 moles per hour of isobutane and 10 moles per hour of n-butane.

This vapor material in line 14 is totally condensed in condenser 16 to a temperature of about 110° F. and a pressure of about 150 p.s.i.g. The condensed $C_3$ hydrocarbons in line 14 are then preferably passed through pumping means not shown to increase the pressure thereof to about 270 p.s.i.g., wherefrom it is subsequently passed into depropanizer tower 20, at a temperature of about 100° F. The purified $C_3$ hydrocarbons in line 21 comprise 240 moles per hour of propane and 5 moles per hour of isobutane. The depropanizer column bottoms are removed via line 22 and comprise 34 moles per hour of isobutane and 4 moles per hour of n-butane.

This invention claims:

1. Method for separating normally gaseous hydrocarbons from the hydrocarbon effluent of an isobutane-olefin alkylation reaction zone which comprises the steps of:
   (a) introducing the hydrocarbon effluent from said reaction zone into the upper section of first fractionation means maintained under fractionation conditions;
   (b) removing an overhead first vapor fraction comprising $C_3$ and $C_4$ hydrocarbons;
   (c) withdrawing a side-cut fraction comprising isobutane at a locus below the locus for introducing said effluent;
   (d) partially condensing said overhead fraction under conditions sufficient to produce a second vapor fraction comprising $C_3$ hydrocarbons and a liquid stream comprising isobutane;
   (e) condensing said side-cut fraction;
   (f) condensing said second vapor fraction;
   (g) passing the condensed second vapor fraction into second fractionation means under conditions sufficient to produce a substantial pure $C_3$ product stream;
   (h) returning isobutane to said reaction zone; and
   (i) removing from said first fractionation means a bottoms fraction comprising alkylate.

2. Method according to claim 1 wherein said olefin comprises butylenes.

3. Method according to claim 2 wherein said side-cut fraction contains a major proportion of the isobutane present in said effluent.

4. Method according to claim 1 wherein said effluent contains $C_3$ hydrocarbons, isobutane, n-butane and alkylate.

5. Method for separating the hydrocarbon effluent from an isobutane-butylene alkylation reaction zone which comprises:
   (a) introducing said effluent at a temperature from 120° F. to 150° F. to the top of a first distillation column;
   (b) removing an overhead vapor fraction comprising $C_3$ hydrocarbons and isobutane at a temperature from 130° F. to 175° F.;
   (c) withdrawing an upper side-cut vapor fraction comprising isobutane at a temperature from 150° F. to 175° F.;
   (d) partially condensing said overhead fraction under conditions sufficient to produce a second vapor fraction comprising $C_3$ hydrocarbons and a liquid stream comprising isobutane;
   (e) condensing said upper side-cut fraction by indirect heat exchange with air;
   (f) condensing said second vapor fraction to produce an impure liquid stream comprising $C_3$ hydrocarbons contaminated with $C_4$ hydrocarbons;
   (g) passing said impure stream into a second distillation column under conditions sufficient to produce a substantially pure $C_3$ hydrocarbon stream and a residual stream comprising $C_4$ hydrocarbons;
   (h) withdrawing from said first distillation column a lower side-cut fraction comprising n-butane;
   (i) removing a bottoms fraction from said first distillation column comprising alkylate at a temperature from 330° F. to 450° F.; and
   (j) recycling condensed isobutane to said reaction zone.

6. Method according to claim 5 wherein said upper side-cut fraction contains a major proportion of the isobutane present in said effluent.

7. Method according to claim 5 wherein said second vapor fraction comprises from 5% to 50% by volume of said overhead fraction.

No references cited.

HERBERT LEVINE, *Primary Examiner.*